United States Patent Office 2,904,137
Patented Sept. 15, 1959

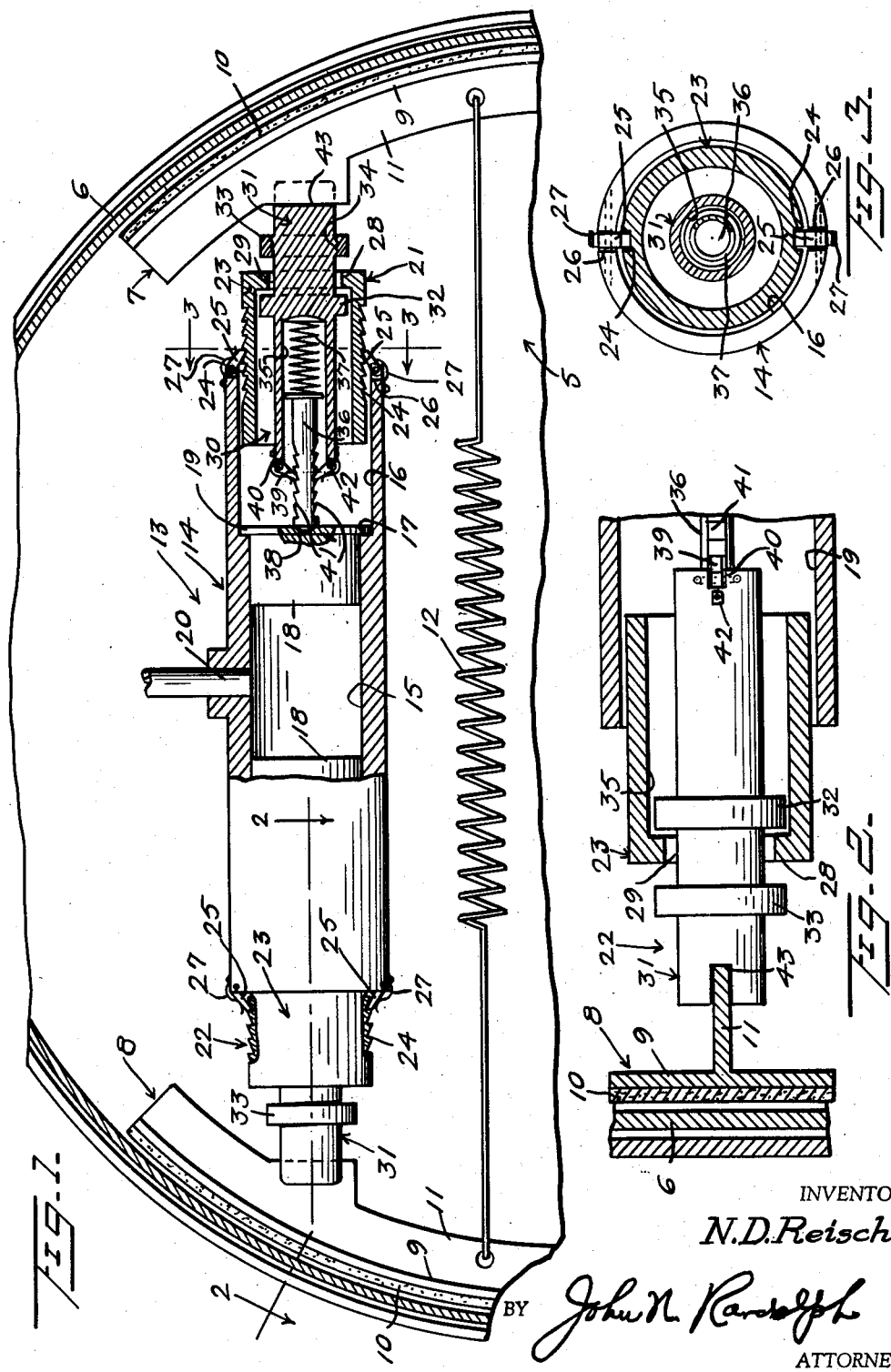

2,904,137

SELF-ADJUSTING WHEEL BRAKE

Norman D. Reisch, Van Nuys, Calif.

Application October 4, 1957, Serial No. 688,254

4 Claims. (Cl. 188—196)

This invention relates to an improved motor vehicle wheel brake and more specifically to a novel unit to replace a conventional pushpin and by which an outward thrust is exerted on a brake shoe and which unit is automatically extensible to compensate for brake lining wear.

More particularly it is an aim of the present invention to provide an extensible push rod element having spring means for automatically extending an extensible part of said element to effect a full return of an actuating element of the brake actuator upon release of the brake, and including novel means to limit return movement of a part of said extensible element to effect an elongation thereof to compensate for brake lining wear.

Still another object of the invention is to provide an extensible pushpin or push rod unit having means permitting movement of the parts thereof toward extended positions and preventing return of said parts to retracted positions.

Various other objects and advantages of the invention will hereinafter become more fully apparent from the following description of the drawing, illustrating a presently preferred embodiment thereof, and wherein:

Figure 1 is a fragmentary sectional view, partly in elevation, of a portion of a wheel brake equipped with the self-adjusting unit;

Figure 2 is an enlarged longitudinal sectional view through a portion of the unit, taken substantially along a plane as indicated by the line 2—2 of Figure 1, and Figure 3 is an enlarged cross sectional view through a part of the unit, taken substantially along a plane as indicated by the line 3—3 of Figure 1.

Referring more specifically to the drawing, a portion of a motor vehicle wheel brake, designated generally 5, is illustrated in Figure 1 including a portion of a conventional brake drum 6 and free end portions 7 and 8 of two conventional brake shoes. The opposite ends of the brake shoes, not shown, are pivotally mounted in any conventional manner for inward and outward swinging movement of the brake shoes toward and away from one another, respectively, and toward and away from the brake drum 6. The brake shoes have arcuate outer flanges 9 to the outer sides of which brake linings 10 are secured, so that the brake linings are disposed between the brake shoes and the brake drum 6. The brake shoes each include a web 11 which extends inwardly from the flange 9 thereof. A pull type return spring 12 is connected to the brake shoe webs 11 for urging the brake shoes to swing toward one another and away from the brake drum 6 for normally retaining the brake linings 10 out of contact with the brake drum. All of the parts previously described are conventional and have been illustrated and briefly described merely to afford a better understanding of the self-adjusting means, designated generally 13 and comprising the invention.

In the embodiment of the invention as disclosed, an elongated tubular member 14 is interposed between the brake shoes adjacent the free ends thereof. The tubular member 14 has an intermediate bore portion 15 of a diameter less than the diameters of the bore portions 16 which are formed in the ends of said tubular member and which form outwardly facing annular shoulders 17 at the inner ends of said enlarged bore portions 16. A pair of oppositely disposed pistons 18 are slidably mounted in the ends of the bore portion 15 and have flanged outer ends 19 disposed in the enlarged bore portions 16. Said flanged ends or piston heads 19 abut against the annular shoulders 17, when the pistons 18 are fully retracted, as seen in Figure 1, for limiting inward displacement of the pistons relative to the bore portion 15 and so that a space will exist between said pistons 18 when in a retracted position. A discharge end 20 of a tube or conduit for supplying a medium under pressure to the tubular member or cylinder 14 discharges into the intermediate portion of the bore 15 between the pistons 18.

The self-adjusting means 13 includes two identical self-adjusting units 21 and 22 which are associated with the two ends of the tubular member or cylinder 14 and each of which includes a guide sleeve 23. The guide sleeves 23 are slidably disposed in and project outwardly from the enlarged bore portions 16. Each guide sleeve 23 is provided with externally disposed ratches which are cut or recessed into the exterior thereof. Said ratches 24 are disposed longitudinally of the sleeve 23 with the transverse sides or shoulders of the ratch teeth facing inwardly and the inclined sides of said teeth facing outwardly. Pawls 25 are pivotally mounted in recesses 26 in the ends of the tubular member or cylinder 14 for swinging movement toward and away from the ratches 24 and are urged to swing inwardly by leaf springs 27 whereby the free end of each pawl 25 is maintained in engagement with the teeth of a ratch 24 located adjacent thereto. The guide sleeve 23 has an inturned annular flange 28 at its outer end defining a central opening 29 of smaller diameter than the bore of the sleeve 23.

An extensible member or pushpin, designated generally 30, includes an outer section 31 in the form of a rod having an outer portion extending loosely through the guide sleeve opening 29 and which outer portion is provided with spaced collars or abutment elements 32 and 33. The abutment elements 32 and 33 are spaced apart a distance substantially greater than the thickness of the flange 28 and are of larger diameter than the opening 29 and are disposed on opposite sides of the flange 28 to permit a limited sliding movement of the pushpin 30 relative to the guide sleeve 23. The inner collar 32 is loosely disposed in the sleeve 23 and the outer collar 33 is disposed between the flange 28 and a portion of the adjacent brake shoe. Said outer collar 33 may be detachably and adjustably mounted on the outer portion of the rod section 31 as by a threaded connection 34. Said outer section 31 extends inwardly through and is loosely disposed in the guide sleeve 23 and has a recessed inner end portion 35 disposed longitudinally thereof and opening outwardly of the inner end of said section 31. A stem 36 has an inner end fitting telescopically into the recess 35. A compression spring 37 is mounted in the recess 35, between the inner end thereof and the inner end of the stem 36, for urging said stem outwardly of the recess 35 and toward the head 19 of the adjacent piston 18. Said piston head 19 has a centrally disposed depression 38 in the outer side thereof in which the outer end of the stem 36 seats. Pawls 39 are pivotally mounted in diametrically opposed recesses 40 formed in the inner end of the rod section 31 for swinging movement toward and away from the stem 36. Ratches 41 are formed in opposite sides of the stem 36, facing the pawls 39 and engaged thereby. The teeth of the ratches 41 face in the opposite direction to the teeth of the ratches 24, that is, the teeth of the ratches 41 have radial shoulders facing inwardly of the recess 35 and inclined outer sides facing the adjacent piston 18. The pawls 39 are urged by leaf springs 42 to swing inwardly toward one another and so that the free ends of said pawls will engage teeth of the ratches 41.

The outer ends of the outer sections 31 are provided with slots 43 which are adapted to engage portions of the brake shoe webs 11, as clearly illustrated in Figures 1 and 2.

The units 21 and 22 of the self-adjusting brake shoe actuating means 13 are shown in retracted positions in Figures 1 and 2. To apply the brake, a fluid medium under pressure is supplied in a conventional manner through the conduit 20 to the space of the cylinder 15 between the pistons 18 for forcing the pistons 18 away from one another. When this occurs, the extensible member or pushpin 30 of each unit 21 and 22 will be forced outwardly or toward the brake shoe to which it is connected. The pawls 39 thereof by engagement with the ratches 41 will prevent the stem 36 from telescoping into the outer section 31. Consequently, the extensible member or pushpin 30 will slide outwardly through its guide sleeve 23. The brake shoes 7 and 8 will thus be caused to swing away from one another to move the linings 10 thereof into engagement with the brake drum 6 to effect application of the brake. This will normally be accomplished without movement of the guide sleeves 23. However, after a brake lining has become worn to a certain extent a greater travel of the extensible pushpin 30 will be required and as a result the inner collar 32 thereof will move into contact with the flange 28 of its sleeve 23 causing said guide sleeve to thereafter move outwardly in unison with the pushpin. If a sufficient outward travel of the guide sleeve 23 thus results the pawls 25 will engage a next innermost tooth of each ratch 24 of said guide sleeve and thus retain the guide sleeve in an extended position to prevent inward displacement thereof when the pushpin 30 is retracted inwardly relative thereto.

Thereafter when the fluid medium under pressure is released in a conventional manner from the cylinder portion 15, the return spring 12 will swing the brake shoes 7 and 8 inwardly and toward one another and away from the brake drum 6. When this occurs the pushpins 30 will slide inwardly through their guide sleeves 23. If either guide sleeve 23 has been previously extended, as previously described, and if the extensible member or pushpin 30 thereof in its inward travel through said guide sleeve then travels sufficiently so that the outer stop 33 of said pushpin strikes the outer side of the flange 28 before the piston 18, associated with said pushpin, has returned to a fully retracted position, the spring 37 will force the stem 36 to an extended position in a direction toward the piston 18 for moving the piston to a fully retracted position with its flange 19 seating against the shoulder 17. If this movement of the stem 36 outwardly of the recess 35 is sufficient so that the pawls 39 can clear additional teeth of the ratches 41, the pawls 39 will then latch the stem 36 in its extended position to thus retain the extensible member or pushpin 30 extended or elongated and so that a shorter travel of the piston 18 will be required thereafter to move the brake lining 10 into engagement with the brake drum 6.

It will be obvious that each extensible unit 21 and 22 is thus automatically adjustable independently of the other to compensate for wear on the brake lining of the shoe which is actuated by said extensible unit 21 or 22. It will also be obvious that the extension of the units 21 and 22 will be accomplished automatically as wear on the brake linings occurs.

While the self-adjusting wheel brake mechanism 13 has been described in connection with a conventional fluid pressure type actuator, it will be readily apparent that said device 13 may be utilized with mechanical brake actuators.

Various modifications and changes are contemplated and may be resorted to, without departing from the function or scope of the invention as hereinafter defined by the appended claims.

I claim as my invention:

1. A self-adjusting device for a vehicle wheel brake comprising, force imparting means including force imparting elements displaceable away from one another, a self-adjusting mechanism comprising corresponding units between which said force imparting elements are disposed, each of said units including an elongated extensible member having an outer end adapted to engage a brake shoe and an inner end engaging the force imparting element located adjacent thereto, said member being formed of telescopically connected end sections, spring means urging said sections to extended positions relative to one another, latch means connecting said sections to one another and preventing movement of said sections toward retracted positions relative to one another, each of said units including a stationary tubular member, a guide sleeve slidably disposed in said tubular member and in which one section of said elongated member is slidably mounted, said section having spaced abutments, said guide sleeve having a portion disposed between said abutments and engaged by one of the abutments when said elongated member is moved outwardly a predetermined distance for moving the guide sleeve with said elongated member toward an extended position relative to the tubular member, said other abutment member engaging said guide sleeve to limit inward movement of said section relative to the guide sleeve, and latch means connecting said tubular member and guide sleeve and preventing inward movement of the guide sleeve relative to the tubular member and whereby the other inner section of said elongated member can be extended by the spring means thereof.

2. A self-adjusting brake mechanism as in claim 1, said units being individually adjustable independently of one another, said first mentioned latch means comprising ratches carried by one telescoping section of each unit and pawls carried by the other section of said unit and engaging the ratches.

3. An automatic brake adjuster for a vehicle wheel brake comprising a stationary tubular member, a force imparting element slidably disposed in the tubular member, a guide sleeve slidably mounted in said tubular member and extending from an end thereof, latch means associated with the tubular member and guide sleeve and permitting the guide sleeve to move toward an extended position outwardly of the tubular member and preventing return movement of the guide sleeve in the opposite direction, an elongated pushpin formed of telescopically connected sections, one of said sections extending slidably through said guide sleeve and having an outer end adapted to engage a brake shoe, the other section having an outer end bearing against said force imparting element and disposed inwardly relative to the guide sleeve, said first mentioned section having spaced abutments including an inner abutment and an outer abutment, said guide sleeve having a portion disposed between said abutments and engaged by the inner abutment after a predetermined outward movement of the pushpin for moving the guide sleeve with the pushpin to an extended position, said outer abutment being engageable with said guide sleeve part when the pushpin is moved in the opposite direction for limiting movement of the first mentioned pushpin section in the last mentioned direction relative to said guide sleeve, spring means urging said other section of the pushpin toward an extended position when the first mentioned section is retained against inward displacement relative to the guide sleeve to return the force imparting element to a fully retracted position and to elongate the pushpin, and latch means associated with the pushpin sections to retain said sections in extended positions and to prevent retraction of the pushpin.

4. In combination with a force imparting element of a brake actuator, an automatic brake adjuster comprising a fixed tubular member extending from the force imparting element, a guide sleeve slidably mounted therein, latch means associated with the tubular member and guide sleeve and permitting movement of the guide sleeve outwardly of the tubular member in a direction away from the force imparting element and preventing return movement thereof, a pushpin having an outer section extending through and slidably disposed in the guide sleeve and having an outer end adapted to engage a brake shoe, lost motion means associated with said outer section and guide sleeve for causing the guide sleeve to be automatically extended relative to the tubular member by movement of the pushpin in one direction to a predetermined extent and for limiting movement of said outer section in the opposite direction, said pushpin including an inner section telescopically engaging the outer section and having an outer end bearing against said force imparting element, spring means urging said inner section toward an extended position for elongating the pushpin when the outer section thereof is held against inward movement by the guide sleeve, and latch means associated with the pushpin sections and retaining the inner section in an extended position.

References Cited in the file of this patent

UNITED STATES PATENTS

| | | |
|---|---|---|
| 2,548,868 | Christenot | Apr. 17, 1951 |
| 2,553,343 | Van Der Wilt | May 15, 1951 |
| 2,766,854 | Roumens et al. | Oct. 16, 1956 |